Dec. 1, 1964  W. PATTERSON ETAL  3,159,018
DEVICE FOR ASCERTAINING THE OPERATIONAL BEHAVIOR
OF MOLDING SUBSTANCES
Filed April 20, 1960  2 Sheets-Sheet 1

INVENTORS:
Wilhelm Patterson
Dietmar Boenisch
BY
Walter Becker.

Form A   Form B

United States Patent Office 3,159,018
Patented Dec. 1, 1964

3,159,018
DEVICE FOR ASCERTAINING THE OPERATIONAL BEHAVIOR OF MOLDING SUBSTANCES
Wilhelm Patterson and Dietmar Boenisch, Aachen, Germany, assignors to Verein zur Forderung der Giesserei-Industrie, Dusseldorf, Germany, a company of Germany
Filed Apr. 20, 1960, Ser. No. 23,533
Claims priority, application Germany, May 15, 1959, V 16,539
6 Claims. (Cl. 73—15.6)

The invention relates to a device for ascertaining the operational behavior of molding substances.

The quality of castings is determined by the working behavior of a molding material i.e. by the sum of its properties when subjected to the casting operation. Under the influence of the casting heat, considerable irregular changes occur in the properties of the molding material, together with a considerable temperature drop from the surface of the mold toward the interior. The heating of the mold surface causes water and/or other volatile constituents to evaporate and to pass through the porous molding material until it is deposited in the relatively cold regions of the mold. The over-wetting of the sand in this condensation layer reaches an extent which has an important influence on the adhesive power of the sand and, therefore, on its working behavior.

Various efforts have been made to test molding sand under conditions approximating those prevailing during actual working. However, no fully satisfactory results have heretofore been obtained.

It is, therefore, an object of this invention to provide an apparatus for testing molding material, as for instance molding sand, which will make it possible for any foundry to ascertain in numerical values the working behavior of the respective molding material being used so as to avail itself of the optimum behavior of such material.

It is a further object of this invention to provide an apparatus which will make it possible to determine the activation effect of various activating agents on the respective molding material available, and also to determine the activating readiness of bonding clays and the quality thereof.

It is a still further object of this invention to provide an apparatus for carrying out a method of testing molding material as for instance molding sand.

These and other objects and advantages of the invention will appear more clearly from the following specification in connection with the accompanying drawings, in which.

Figure 1:
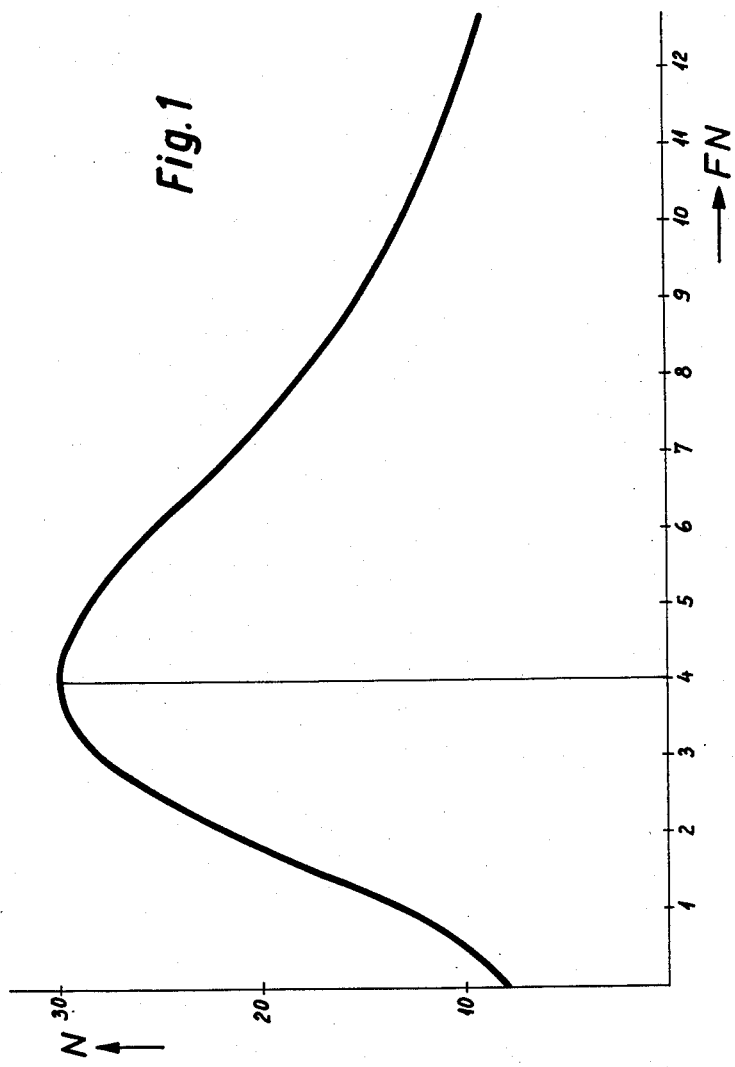
FIG. 1 is a diagram of an activation curve.

Applicants have found that the working behavior of a molding sand can be ascertained by measuring the tensile strength of e.g. a cylindrical test piece or test block, one end face of which is heated to produce in the interior of the said piece a temperature gradient and a layer of over-moistened sand. This strength which is tested will be referred to hereinafter as the "wet tensile strength" or "wet strength" and will be indicated in g./cm.² Other properties of the sand e.g. compressive strength or shearing strength may be determined in addition to the tensile strength. The influence of the casting heat establishes in the sand surface a temperature gradient which leads to a non-homogeneous moisture distribution. Below the sand surface there is produced an over-moistened zone of greatly reduced strength. The testing method according to the invention makes it possible for the strength in this region to be measured quantitatively. The tested value designated as "wet strength" is closely connected with errors in castings which may come about due to the expansion of the sand. High wet strength means that there is little tendency towards sand expansion errors. Additionally, the testing method according to the invention makes it possible to determine quantitatively the degree of activation of bentonites. It has been found that even non-bentonitic clays can be activated, this being evidenced by the partly considerable increase in wet strength and thus by prevention of sand expansion errors. The evaluation of these results makes it possible to use even non-swellable clays and to build up semisynthetic or fully synthetic molding sands of high thermal stability and low tendency to cause sand expansion errors.

The method in accordance with this invention may advantageously be practiced by an apparatus according to this invention whereby realistic conditions such as occur in the molding sand under the action of the casting heat can be produced in a test piece, and the latter can be tested under these conditions.

According to the invention, this is achieved by a tube which receives the test piece or test block and on which may be placed a draw plate whose inner surface is shaped appropriately in order to connect with the test piece, for example in the form of grooving, undercutting or the like, in conjunction with a device for heating the draw plate and a device for removing the draw plate with a measurable pulling force. In a further development of the invention, this apparatus may be so constructed that it is fully assured that the test piece will be free to break off at the place where the condensate has formed. This may be realized by a piston, which forms the end wall of the tube opposite the draw plate and by means of which the test piece after the heating operation and prior to the tearing operation is partly pushed out of the tube at the draw plate end in order to expose a region of its cylindrical surface.

As regards the shape of the draw plate, it is intended to ensure that during the tearing operation it should held the dried end face zone of the sand piece securely to the inner surface of the draw plate. For this purpose, in the preferred embodiment of the invention, the inside of the draw plate can be given the shape of a circular dovetail. Alternately, a good grip for the test piece on the cover can also be obtained by undercut grooves which are formed on the inner surface of the cover and which are best arranged in concentric fashion.

It is expedient to make the draw plate plane parallel in order to assure uniform heating.

Figure 2:
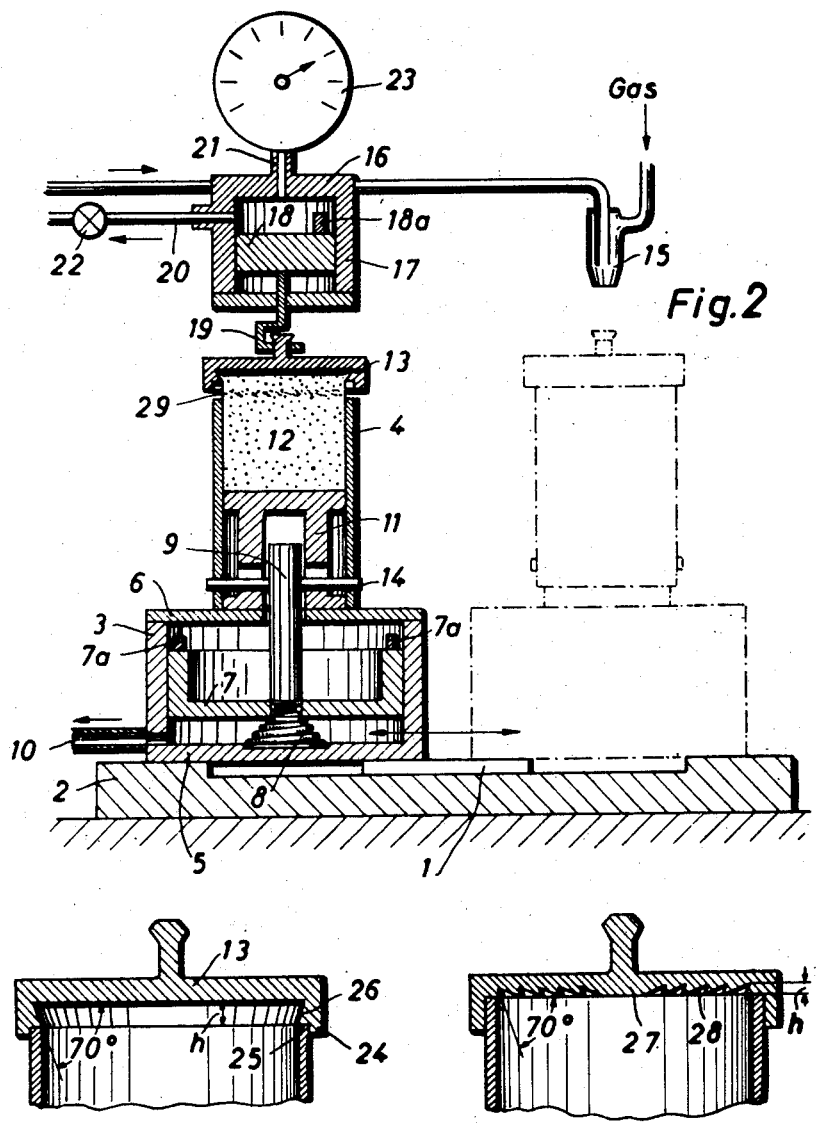
FIG. 2 is a sectional view through a diagrammatically illustrated testing apparatus according to the invention, said apparatus being shown in its tearing or testing position in full lines and also being shown during the heating operation in dot-dash lines.

Referring now to the drawings in detail, the apparatus shown in FIG. 2 comprises a displaceably arranged base plate 2 provided with a guiding slot 1 for part 3. Mounted on plate 2 is a support 3 for a testing tube 4. The support comprises a hollow cylinder with end walls 5 and 6 which are perpendicular to its axis, and also comprises a piston 7 which is axially displaceable in the cylinder and which bears by means of a spacer ring 7a against the end wall 6 under the action of a coil spring 8 bearing against the end wall 5. A rod 9 arranged axially in piston 7 projects through a hole in the wall 6. Also arranged at the cylinder, between piston 7 and wall 5, is a pipe line 10 adapted for connection to a suction device not shown in the drawings.

Rod 9 engages a piston 11 resting on support 3 and fitting in test tube 4 which contains a specimen of compressed sand. Tube 4 is closed by draw plate 13 which previously formed the bottom of tube 4 when the specimen was rammed in it. A pin 14 extends through appropriate holes in the testing tube 4 and the rod 9 and through axial parallel slots 11a in the piston 11. The tube 4 is thereby fixedly connected to the rod 9, but together with said rod can carry out a slight movement relative to the piston 11 resting on the support 3. Cover 13 is heated by heating device 15, e.g. a gas jet, which is fixedly connected to a device generally designated 16 for tearing the test piece apart and indicating the pulling force. The tearing device comprises a hollow cylinder 17 with a piston 18 reciprocably mounted therein. Piston 18 carries a rod 19 projecting through the bottom of cylinder 17 and having a coupling 19a which engages a knob arranged on the draw plate 13. The stroke of piston 18 as executed at the tearing operation is limited by a spacer pin 18a arranged at the piston face opposite from the rod 19. At this side of the piston also pipes 20 and 21 open into the cylinder chamber. Pipe 20 in which a valve 22 is arranged leads to the aforesaid suction device. The pipe 21 leads to a vacuum meter 23 which is graduated in units of tensile strength.

Figure 3:
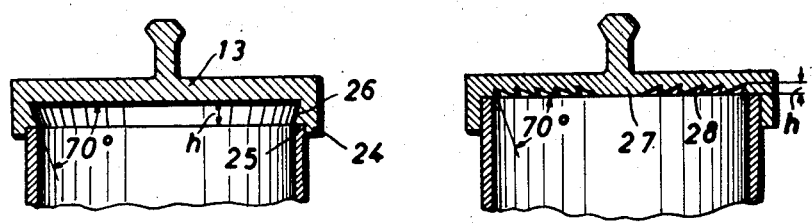
FIG. 3 is a cross sectional view of two embodiments of the draw plate used in connection with the testing apparatus according to the invention.

In form A illustrated in FIG. 3, the draw plate 13 has a rim 24 which fits the end face 25 of the testing tube 4. The inner cylindrical surface 26 of the rim 24 is conically undercut. The height $h$ of the rim must be smaller than the thickness of the dried-out end face zone of the test piece. Heights $h$ of 3 to 5 mm. and angles of conicity of 65 to 75° have proved satisfactory. In the draw plate 13b shown form B of FIG. 3 the inner base surface 27 is provided with concentric annular grooves 28 whose cross-section is in the form of undercut saw teeth. The tooth height $h'$ may advantageously amount to about 2 to 4 millimeters. A suitable material for the draw plate is, for example, a heat-resistant steel.

The method in which the apparatus according to the invention operates will now be described as an example of testing a molding sand.

After the testing tube 4 has been placed on the draw plate 13 the tube is filled with an adequate quantity of bonded sand so that after consolidation by a few blows, e.g. three blows of a ramming apparatus of known construction, a test specimen is produced corresponding to standard requirements. The tube 4 is then inverted with the specimen 12 therein and the draw plate 13 and placed on the piston 11 resting on the support 3, and is moved below the gas jet 15. Then the pin 14 is passed through the holes in the tube 4, rod 9 and piston 11. The draw plate is now marked with a thermocolor pencil responding to a temperature of 300° C., said marking indicating by its color change after heating for 30 seconds that this temperature has been reached. The test block is now transferred from its dot-dash position of FIG. 2 below jet 15 to the tearing position shown in full lines, in which the knob 4a on the outer side of the draw plate 13 engages the claw 19a of the pulling device 16. After the tearing position has been reached, a valve (not shown) in the suction pipe 10 will be opened, whereby the cylinder 7 is subjected to suction, and the testing tube 4 is pulled downwards by means of the rod 9 and pin 14 until abutment against the support 3 is reached, whilst the specimen 12 remains in its previous position. The height of the exposed zone of specimen 12 should be about 5 millimeters. Immediately after the condensate layer 29 is exposed, the valve 22 in the pipe 20 is opened, and the negative pressure in the cylinder 17 gradually intensifies until the force of the piston 18 is sufficient to tear the specimen apart. The adhesion between the sand piece and the specimen is generally high enough to retain the part of the sand specimen which remains in the testing tube. With sands of high wet strength, the test block may be prevented from sliding out by slightly roughening the inner side of the tube or by providing a slight conicity. The tearing strength of the specimen can be read from the indicator of the vacuum meter 23.

Since the apparatus according to the invention is to be capable of indicating very small forces with great accuracy, it is expedient for the working operations necessary for carrying out the measurement to be controlled as automatically as possible in order to eliminate to the highest degree possible all sources or error due to human causes and waiting periods.

The method of testing for wet strength according to the invention may now be explained with reference to the following example.

*Example*

From a sand mixture which contains six parts by weight of bentonite to 100 parts by weight of silica sand (average grain size $MK=0.23$ mm.; degree of uniformity $GG=75\%$), a cylindrical specimen is produced and one end face is heated in about 30 seconds to about 300° C. i.e. a temperature below the $\beta-\alpha-=$ transformation temperature (575° C.). Then the piece is torn apart at once by means of the apparatus described above.

The wet strength of the molding sand mixture described hereinbefore was ascertained as 8 grams per square centimeter using calcium bentonite. After converting calcium bentonite to an equivalent sodium bentonite by addition of 4 grams of sodium carbonate per 100 grams of clay the wet strength reached a value of 30 grams per square centimeter. It was found that it is possible to activate the sand in this way during its preparation.

It was also found by experiment that the wet strength is dependent both on the kind as well as on the quantity of the activating agent added. It was surprisingly found that with a gradually increasing addition of activating agent (FN) the wet strength (N) of a molding sand mixture extends in the form of a curve which is called the activation curve, with a distinctive maximum value or peak as shown in FIG. 1, the working behavior of the molding sand improves to the extent that its wet strength approaches the maximum value of the curve. If the value of the wet strength is on the ascending part of the curve, the state of the molding material is referred to as "under-activated" whereas a value found to be on the descending part of the curve represents an "over-activated" sand. The improvement of the working behavior in the case of the under-activated sand is effected by adding an activating agent such as sodium carbonate, whereas over-activated sand is improved by adding non-activated bonding clay.

The method according to the invention makes it possible for any foundry to ascertain in numerical values the working behavior of molding materials which they are using and to assure the optimum behavior of such materials. In addition, the method according to the invention makes it possible to determine the activation effect of various activating agents and also the activating readiness of bonding clays and the quality thereof.

It is, of course, to be understood that the present invention is, by no means, limited to the particular method and device described herein, but also comprises any modification within the scope of the appended claims.

What we claim is:

1. In a testing apparatus for ascertaining the working behavior of moist-bound molding material by measuring the tensile strength of a specimen consisting of such material, which comprises: a tubular member for receiving a specimen of moist-bound molding material to be tested, a draw plate adapted to be placed detachably on said tubular member for engagement with the specimen to be received by said tubular member, heating means for heating said draw plate and thereby the test piece therebelow, and power operated means for separating said tubular member and said draw plate from each other and thereby tearing a specimen in said tubular member apart whereby the respective force required for said separation can be measured, said draw plate being undercut for facilitating the connection thereto of molding material from said test piece when said tubular member and said draw plate are pulled apart.

2. In a testing apparatus for ascertaining the working behavior of moist-bound molding material by measuring the tensile strength of a specimen consisting of such material, which comprises: a tubular member for receiving a specimen of moist-bound molding material to be tested, a draw plate adapted to be placed detachably on said tubular member for engagement with the specimen to be received by said tubular member, heating means for heating said draw plate and thereby the test piece therebelow, and power operated means for separating said tubular member and said draw plate from each other and thereby tearing a specimen in said tubular member apart whereby the respective force required for said separation can be measured, said draw plate being provided with grooves for facilitating the connection thereto of molding material from said specimen when said tubular member and said draw plate are pulled apart.

3. In a testing apparatus for ascertaining the working behavior of moist-bound molding material by measuring the tensile strength of a specimen consisting of such material, which comprises: a tubular member for receiving a specimen of moist-bound molding material to be tested, a draw plate adapted to be placed detachably on said tubular member for engagement with the test piece to be received by said tubular member, said draw plate including means operable to engage the test piece interlockingly, piston means forming the end wall of the tubular member opposite said draw plate, heating means for heating said draw plate and thereby said specimen, means for moving the tubular member toward the piston means to thereby expose a portion of the specimen adjacent said draw plate, and means operable to engage said draw plate and move the same away from said piston means.

4. In a testing apparatus for ascertaining the working behavior of moist-bound molding material by measuring the tensile strength of a specimen consisting of such material, which comprises: a tubular member for receiving a specimen of moist-bound molding material to be tested, a draw plate adapted to be placed detachably on said tubular member for engagement with the specimen to be received by said tubular member, heating means for heating said draw plate and thereby the test piece therebelow, and power operated means for separating said tubular member and said draw plate from each other and thereby tearing a specimen in said tubular member apart whereby the respective force required for said separation can be measured, said draw plate consisting of a disc with parallel plane faces and a rim at right angles to the said faces, the inner surface of the said rim being conically undercut.

5. In a testing apparatus for ascertaining the working behavior of moist-bound molding material by measuring the tensile strength of a specimen consisting of such material, which comprises: a tubular member for receiving a specimen of moist-bound molding material to be tested, a draw plate adapted to be placed detachably on said tubular member for engagement with the specimen to be received by said tubular member, heating means for heating said draw plate and thereby the test piece therebelow, and power operated means for separating said tubular member and said draw plate from each other and thereby tearing a specimen in said tubular member apart whereby the respective force required for said separation can be measured, said draw plate consisting of a disc having substantially parallel plane faces and a rim perpendicular thereto, the inner surface of the said rim surrounding the periphery of said tubular member, the inner surface of said draw plate being provided with concentric grooves forming undercut surfaces.

6. In a testing apparatus for ascertaining the working behavior of moist-bound molding material by measuring the tensile strength of a specimen consisting of such material, which comprises: a cylinder, a first end wall arranged at one end of said cylinder, a second end wall arranged at the other end of said cylinder, a first piston reciprocably mounted in said cylinder, spring means interposed between said piston and said first end wall and continuously urging said piston in the direction towards said second end wall, passage means extending from the interior of said cylinder toward the outside and being located between said first end wall and said piston for connection with a source of suction, a tubular member supported by said second end wall, a second piston reciprocably mounted in said tubular member for a certain limited stroke, means connected to said first piston and fixedly connected to said tubular member while being connected to said second piston with lost motion, said tubular member together with said second piston confining a chamber for receiving a specimen of the molding material to be tested, a draw plate detachably connectable to said tubular member for completely confining with said tubular member and said second piston, a specimen of the molding material to be tested, and fluid operable means operatively connected to said draw plate for pulling the latter away from said tubular member and thereby tear apart the specimen in said tubular member.

References Cited in the file of this patent

UNITED STATES PATENTS

| | | |
|---|---|---|
| 2,237,593 | Dunbeck | Apr. 8, 1941 |
| 2,485,981 | McIlvaine | Oct. 25, 1949 |
| 2,491,512 | Moore | Dec. 20, 1949 |
| 2,504,133 | Kerlin | Apr. 18, 1950 |
| 2,520,786 | Scott | Aug. 29, 1950 |
| 2,521,206 | Dietert et al. | Sept. 5, 1950 |
| 2,837,915 | Brown et al. | June 10, 1958 |

FOREIGN PATENTS

| | | |
|---|---|---|
| 274,281 | Switzerland | June 16, 1951 |